United States Patent
Etani et al.

(10) Patent No.: US 8,977,758 B2
(45) Date of Patent: Mar. 10, 2015

(54) SERVICE BUS SYSTEM, SERVICE BUS DEVICE, AND METHOD FOR ASSURING CONNECTION UNIQUENESS

(71) Applicant: Fujitsu Limited, Kawasaki (JP)

(72) Inventors: Tameyuki Etani, Nara (JP); Takao Inaguma, Anjo (JP); Hiroyuki Iriyama, Komaki (JP); Kouichi Takada, Toyoake (JP); Takashi Tanaka, Nagoya (JP); Masakatsu Fujita, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 13/716,751

(22) Filed: Dec. 17, 2012

(65) Prior Publication Data

US 2013/0198393 A1  Aug. 1, 2013

(30) Foreign Application Priority Data

Jan. 27, 2012  (JP) ................ 2012-015727

(51) Int. Cl.
*G06F 15/16* (2006.01)
*H04L 29/08* (2006.01)

(52) U.S. Cl.
CPC .......... *H04L 29/08576* (2013.01); *H04L 67/14* (2013.01); *H04L 67/146* (2013.01)
USPC ........... 709/227; 709/217; 709/218; 709/219; 709/228

(58) Field of Classification Search
USPC .......................... 709/217, 218, 219, 227, 228
See application file for complete search history.

(56) References Cited

U.S. PATENT DOCUMENTS

| | | | | |
|---|---|---|---|---|
| 2005/0273518 A1* | 12/2005 | Patrick et al. | ................. | 709/238 |
| 2005/0273520 A1* | 12/2005 | Patrick et al. | ................. | 709/246 |
| 2006/0212593 A1* | 9/2006 | Patrick et al. | ................. | 709/230 |
| 2009/0327557 A1* | 12/2009 | Sakurai | ................. | 710/300 |
| 2010/0173654 A1* | 7/2010 | Little | ................. | 455/466 |
| 2011/0004690 A1* | 1/2011 | Georgel et al. | ................. | 709/227 |

FOREIGN PATENT DOCUMENTS

| | | |
|---|---|---|
| JP | 2003-152783 | 5/2003 |
| JP | 2010-9218 | 1/2010 |

* cited by examiner

*Primary Examiner* — Liangche A Wang
(74) *Attorney, Agent, or Firm* — Staas & Halsey LLP

(57) ABSTRACT

A service bus system includes: a plurality of first devices each coupled with a client; a plurality of second devices each to perform a service; a first service bus device through which sequences of a session between the first and second devices are communicated, including: a prediction unit to predict one or more other service bus devices through which connection between the first and second devices in a second or later sequence of the session is established; and a transmission unit to transmit information indicating the connection in the first sequence of the session to the one or more other service bus devices predicted; and a second service bus device including: a storage unit to hold the information transmitted from the first service bus device; and a connection unit to establish the connection in the second or later sequence of the session by using the connection information held.

12 Claims, 14 Drawing Sheets

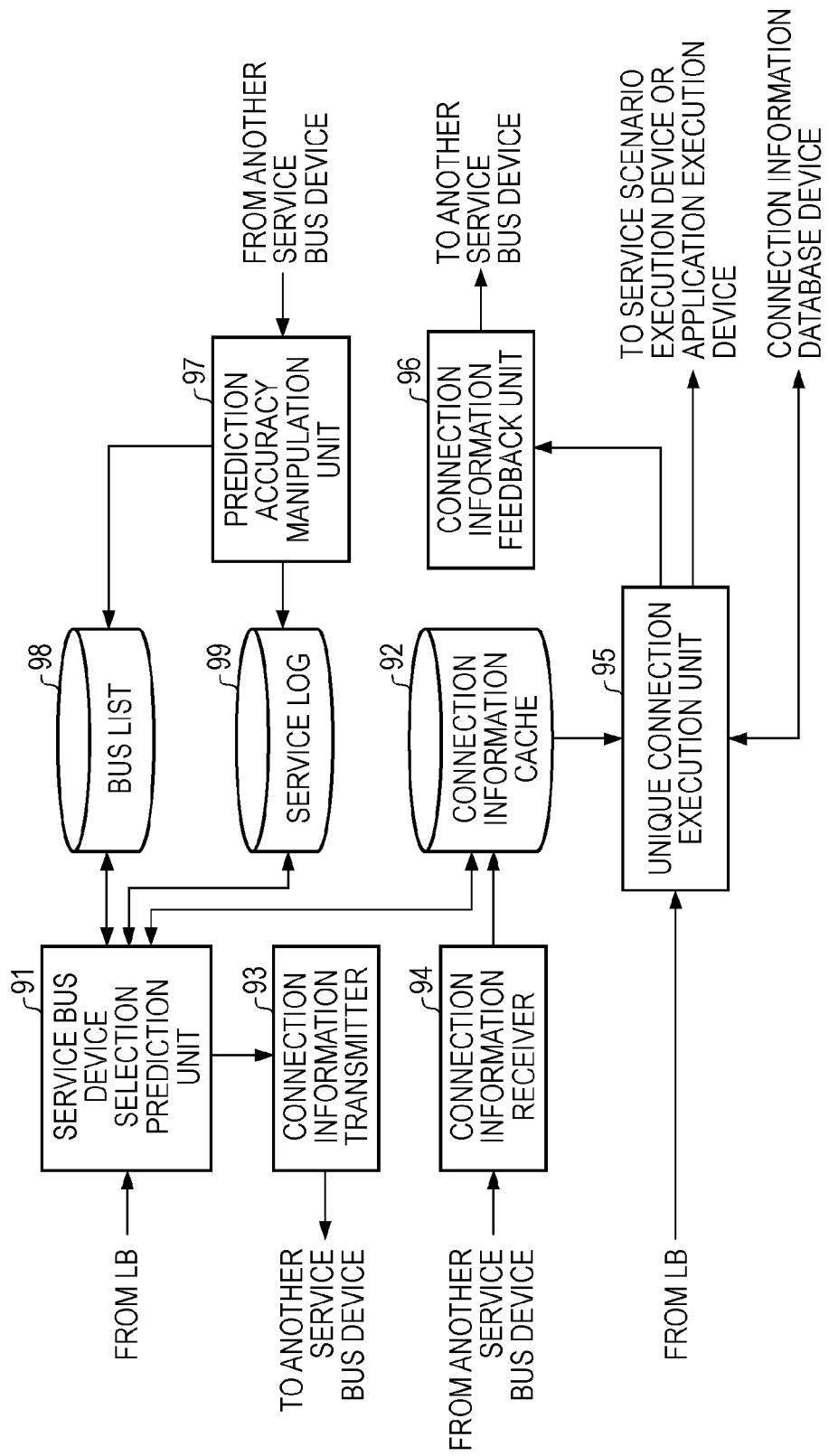

FIG. 6

| FIELD | SERVICE NUMBER | REQUEST ID | SERVICE SCENARIO NODE | APP NODE | LAST UPDATED | PREDICTION TRUE/FALSE DESTINATION |
|---|---|---|---|---|---|---|
| EXAMPLE | 22 | 22APL0001SesA005 | http://10.182.xx.xx | mlp://10.182.xx.xx | 09/01/2010 18:45 51:05 | 10.102.yyy.zz |
| | ... | ... | http://xxx.yyy.com | sip://zzz.com | ... | yyy.zzz.com |

FIG. 7

| FIELD | SERVICE BUS NUMBER | ADDRESS | TIME ZONE 1 (WEIGHTED VALUE) | TIME ZONE 2 (WEIGHTED VALUE) | ... | SERVICE 1 (WEIGHTED VALUE) | SERVICE 2 (WEIGHTED VALUE) |
|---|---|---|---|---|---|---|---|
| EXAMPLE | 01021156 | 10.182.xx.xx | 100 | 100 | | 100 | 100 |

FIG. 8

| FIELD | SERVICE NUMBER | APP NUMBER | SESSION IDENTIFIER | USED SERVICE BUS NUMBER | SESSION COMPLETION FLAG | LAST UPDATED |
|---|---|---|---|---|---|---|
| EXAMPLE | 22 | APL0001 | SesB | 10 | true/false | 09/01/2010 18:45 51:05 |

FIG. 9A

```
CONNECTION INFORMATION OBJECT {
    REQUEST ID,
    SERVICE SCENARIO URL,
    APP URL,
    PASS/FAIL RESULT DESTINATION
}
```

FIG. 9B

```
CONNECTION FEEDBACK INFORMATION TRANSMISSION OBJECT {
    REQUEST ID,
    REQUEST/RESPONSE TYPE (0 : REQUEST ; 1 : RESPONSE)
    OWN SERVICE BUS NUMBER,
    PASS/FAIL RESULT (1 : CACHE HIT ; OTHERS THAN 1 : NO CACHE HIT)
}
```

FIG. 9C

```
LOAD COLLECTION/REGISTRATION OBJECT {
    SERVICE BUS NUMBER,
    COLLECTION DATE/TIME,
    CPU LOAD,
    OPERATING BUS SESSION NUMBER
}
```

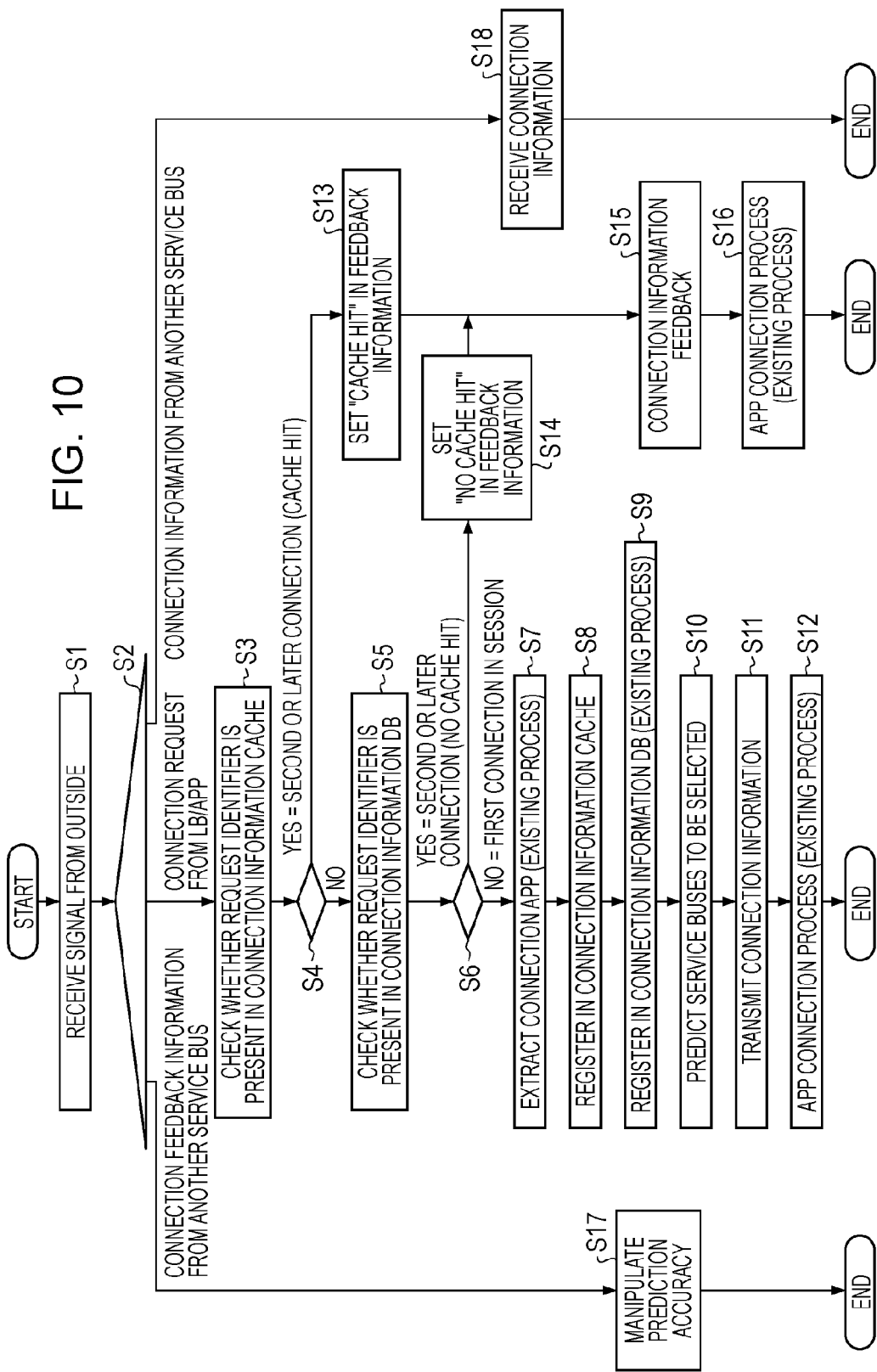

SERVICE BUS SYSTEM, SERVICE BUS DEVICE, AND METHOD FOR ASSURING CONNECTION UNIQUENESS

CROSS-REFERENCE TO RELATED APPLICATION

This application is based upon and claims the benefit of priority of the prior Japanese Patent Application No. 2012-015727, filed on Jan. 27, 2012, the entire contents of which are incorporated herein by reference.

FIELD

The embodiment discussed herein relates to a service bus system, a service bus device, and a method for assuring connection uniqueness.

BACKGROUND

There is a concept of service-oriented architecture (SOA) for effectively utilizing software assets in constructing an enterprise system. SOA refers to a system architecture that is intended to construct a flexible enterprise system or inter-company business process execution system by constructing and organizing software components or functions in such a manner that the software components or functions match the components of a business process, making such software components or functions public on a network (referred to as "applications"), and causing them to collaborate.

A base for effectively connecting software components made public by SOA is a concept of service bus, which is typified by an enterprise service bus (ESB). In SOA, accessing software assets that are converted into services desires knowing the protocol, IP address position, or the like of the access destination from a scenario of the access source, such as enterprise system. A service bus is used to perform this.

FIG. 1 illustrates a concept of service bus. In FIG. 1, scenarios 1 and 2 are connected to a service bus 5 via a network, and applications 3 and 4 are connected to the service bus 5 via another network. In accessing the applications 3 and 4, the scenarios 1 and 2 are simply desired to access the service bus 5 using the desired protocol or data form; they do not have to know the protocol or position of the applications 3 and 4. This makes it possible to efficiently develop the scenarios 1 and 2. The service bus 5 has protocol and data conversion functions and performs these functions by performing common protocol communications within itself.

FIG. 2 is a configuration diagram of an example of a service bus system for performing network services. A service bus system 10 includes service scenario execution devices (may be referred to as "service scenarios") 11a to 11c, a load balancer 12, service bus devices (may be referred to as "service buses") 13-1 to 13-n, and application execution devices (may be referred to as "applications") 14a to 14d. The service scenarios 11a to 11c are, for example, network telephone directory services, voice translation services, voice delivery services, or the like. The applications 14a to 14d are, for example, position information applications, translation applications, 3rd party call control (3PCC) applications, groupware, or the like.

In the service bus system 10, the service scenario execution devices 11a to 11c causes, through the service bus devices 13-1 to 13-n, the application execution devices 14a to 14d serving as back ends to collaborate. Thus, services are provided to user devices 15a to 15c or the like connected to the service scenario execution devices 11a to 11c. In the service bus system 10 configured as described above, about several to several thousand service bus devices 13-1 to 13-n are distributed for performance distribution, and each connection is allocated to one of the service bus devices 13-1 to 13-n by the load balancer 12.

As illustrated in FIG. 3, a single session between the service scenario 11a and the application 14a-1 may generate multiple sequences, since state transitions occur in a protocol such as session initiation protocol (SIP). That is, the first sequence is the first request from the service scenario 11a to the application 14a-1, and the service bus 13-1 is selected by the load balancer 12. The second sequence is a response from the application 14a-1 to the service scenario 11a, and the service bus 13-2 is selected by the load balancer 12. The third sequence is an additional request from the service scenario 11a to the application 14a-1, and the service bus 13-3 is selected by the load balancer 12. The fourth sequence is a response from the application 14a-1 to the service scenario 11a, and the service bus 13-4 is selected by the load balancer 12.

In sequences of the same session as described above, uniqueness of connection between a service scenario and an application have to be assured. Conventionally, to assure connection uniqueness in the same session, the service bus devices 13-1 to 13-n are provided with a common connection information database 16 and share connection information in the same session using the connection information database 16.

Specifically, when one of the service bus devices 13-1 to 13-n receives a session start request from one of the service scenario execution devices 11a to 11c, the service bus device registers connection information, that is, a session ID, device information of the service scenario that has made the request, and device information of an application that is to process the request, in the connection information database 16. Subsequently, when one of the service bus devices 13-1 to 13-n receives a response or the like from the application or when it receives a request or the like from the service scenario, the service bus device searches the connection information database 16 using the session ID of the received response or request to read the connection information. The service bus device then determines the destination service scenario or application of the response or request on the basis of this connection information.

If an additional service bus is provided, the node identifiers and positions of the existing service buses, to which the additional service bus is connected, are registered in the bus node table of the additional service bus. A bus node table refers to a table for storing the respective identifiers and positions of the service bus possessing the bus node table and adjacent service buses. The additional service bus then transmits bus node table update information to the existing service buses. Based on the bus node table update information, the existing service buses register the node identifier and position of the additional service bus in their bus node tables. Technologies that can cause multiple service buses to collaborate, as described above, have been proposed (for example, see Japanese Laid-open Patent Publication No. 2010-9218).

On the other hand, in response to a connection request for a new session from a client, a destination server allocates a session identifier to the new session. The destination server then stores the session identifier in a priority information storage unit in such a manner that the session identifier is associated with priority information and communication quality corresponding to the priority information. When a transfer unit receives a packet from the client or server, it transfers the packet with the communication quality corresponding to the priority information. This makes it possible to perform priority control on clients corresponding to the desire of a service provider. Such technologies have been proposed (for example, see Japanese Laid-open Patent Publication No. 2003-152783).

SUMMARY

According to an aspect of the invention, a service bus system includes: a plurality of first devices each coupled with a client; a plurality of second devices each to perform a service; a first service bus device through which sequences of a session between the first device and the second device are communicated, including: a prediction unit, when connection between one of the plurality of first devices and one of the plurality of second devices is established in a first sequence of the session, to predict one or more other service bus devices through which connection between the first device and the second device in a second or later sequence of the session is established; and a transmission unit to transmit information indicating the connection between the first device and the second device in the first sequence of the session to the one or more other service bus devices predicted by the prediction unit; and a second service bus device through which the sequences of the session between the first device and the second device are communicated, including: a storage unit to hold the information indicating the connection between the first device and the second device in the first sequence of the session transmitted from the first service bus device; and a connection unit, when the second service bus device receives the second or later sequence of the session and the storage unit holds the information indicating the connection between the first device and the second device in the first sequence of the session, to establish the connection between the first device and the second device in the second or later sequence of the session by using the connection information held by the storage unit, wherein one of the one or more other service bus devices predicted by the first service bus device is the second service bus device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a functional configuration of an example of a service bus device;

FIG. 6 is a diagram illustrating an example of the data structure of connection information;

FIG. 7 is a diagram illustrating an example of the data structure of a bus list;

FIG. 8 is a diagram illustrating an example of the data structure of a service log;

FIGS. 9A to 9C are diagrams illustrating an example of the data structure of an inter-device message;

FIG. 10 is a flowchart illustrating an example of a selection prediction process;

DESCRIPTION OF EMBODIMENTS

Figure 1:
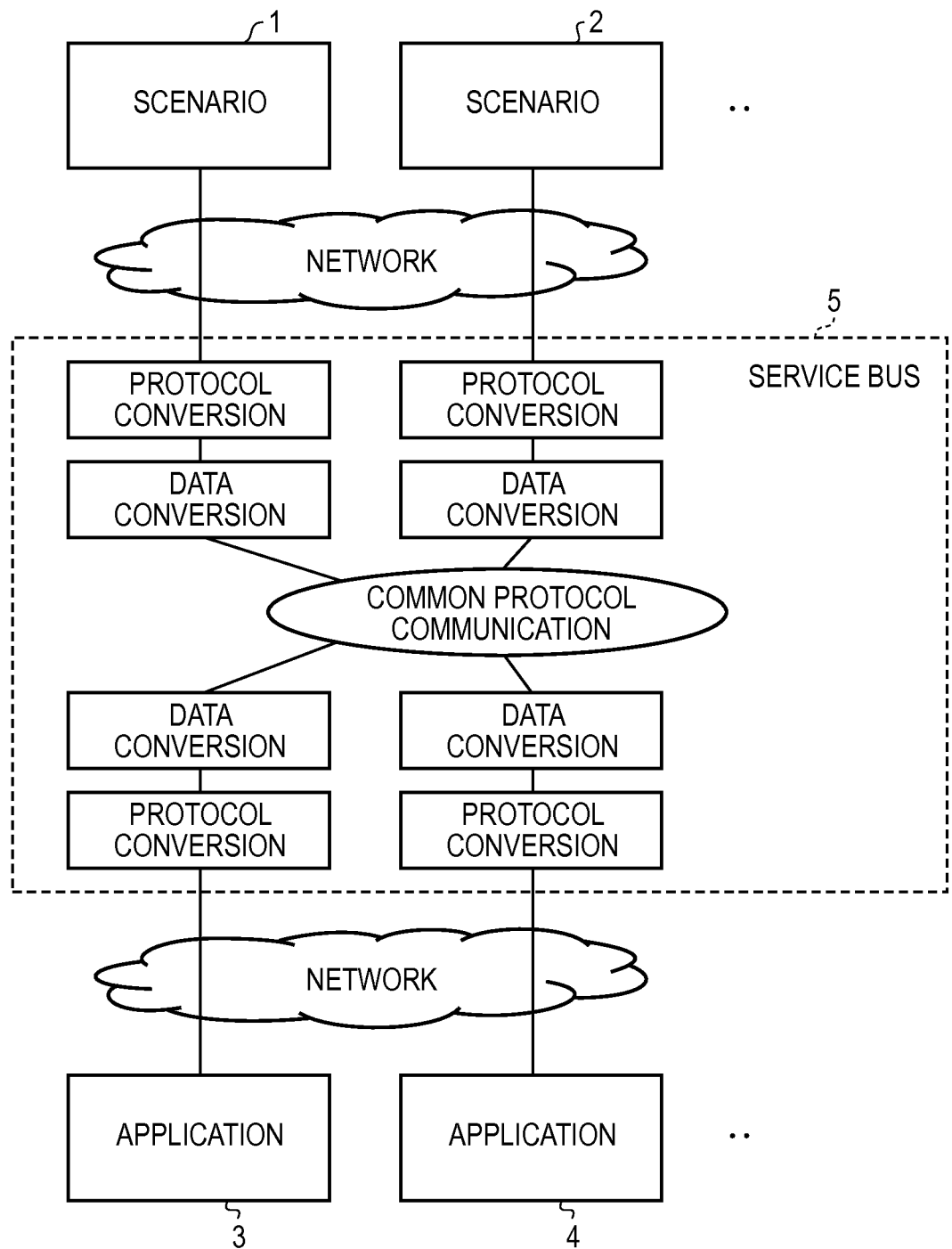
FIG. 1 is a diagram illustrating the concept of a service bus.
Figure 2:
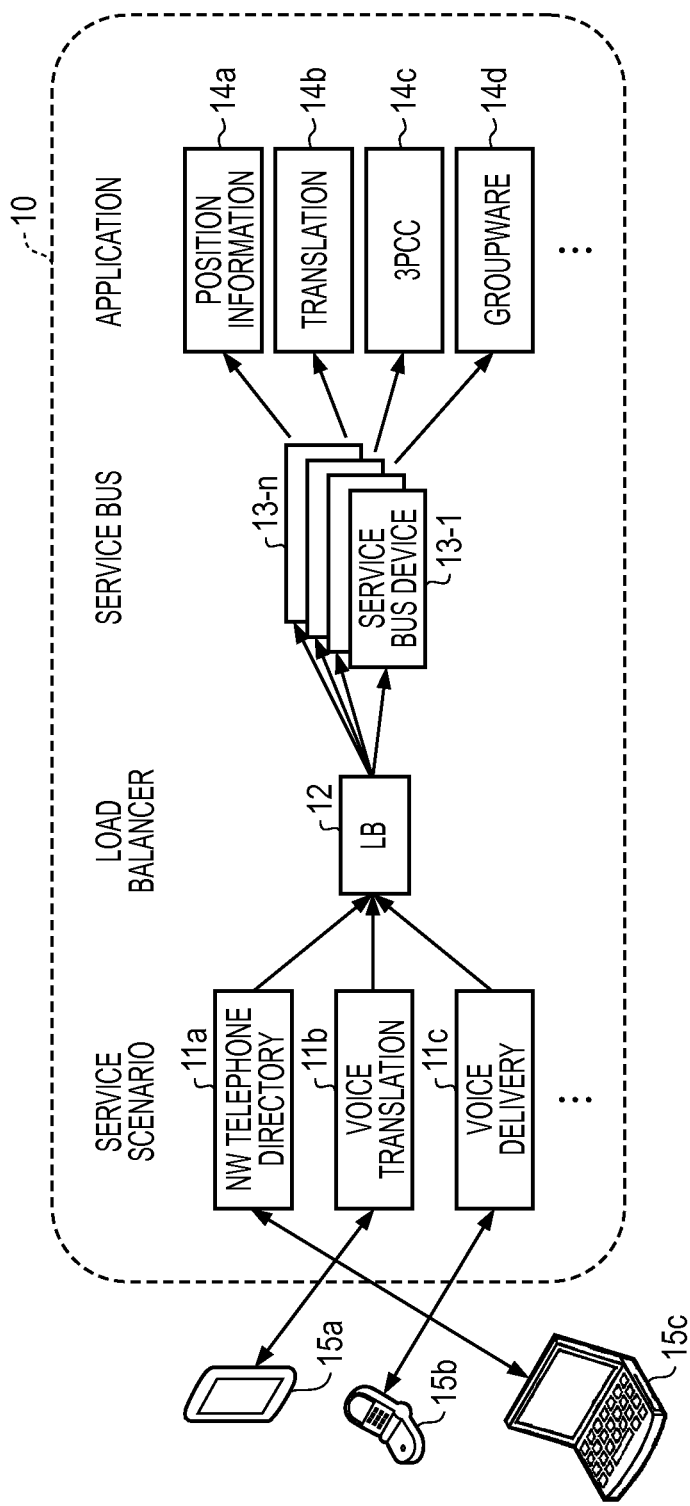
FIG. 2 is a configuration diagram illustrating an example of a service bus system.
Figure 3:
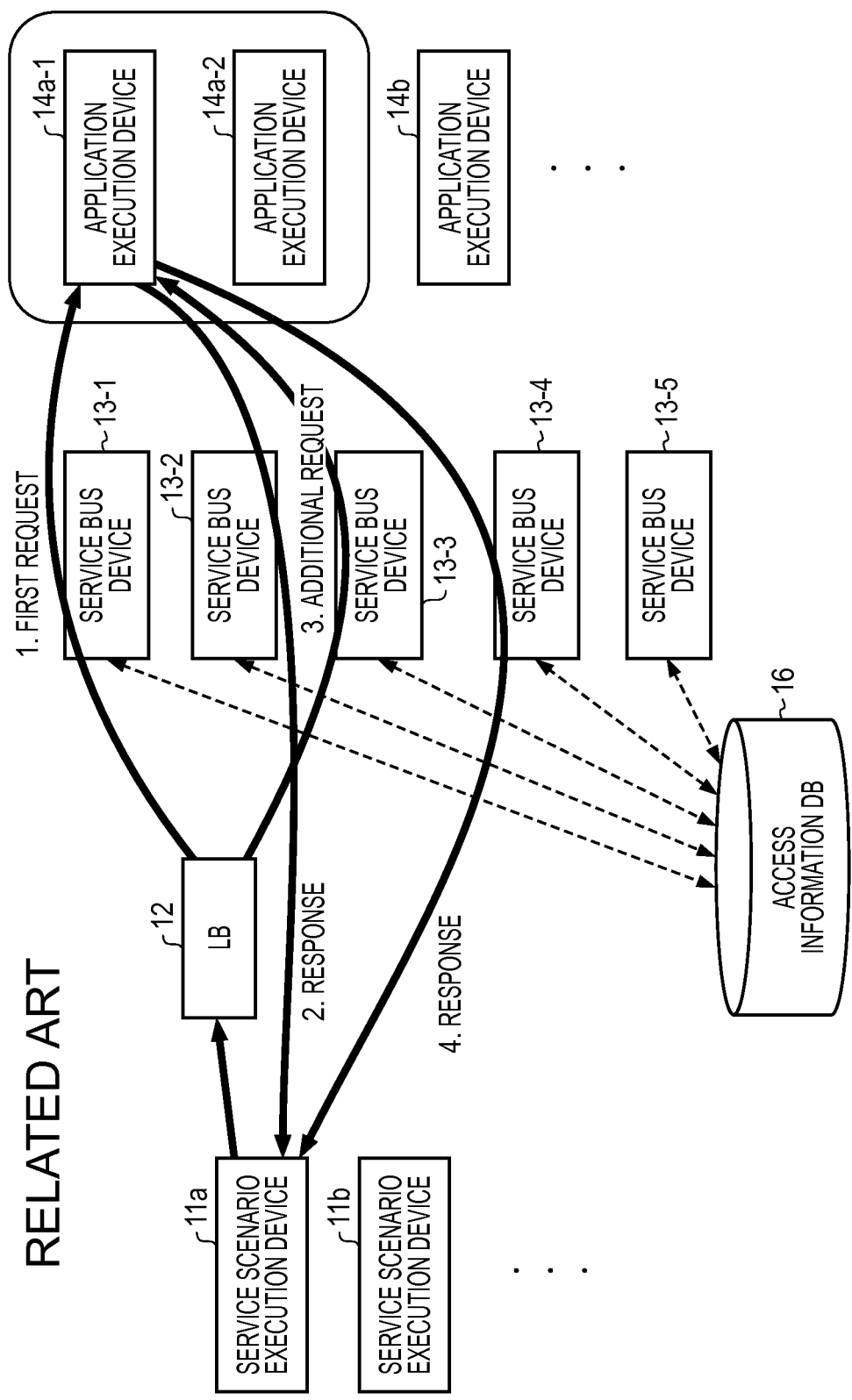
FIG. 3 is diagram illustrating connection uniqueness assurance.

In FIG. 3, although the service buses are distributed, accesses to assure connection uniqueness are locally concentrated on the connection information database 16. If the amount of service traffic and the number of service bus devices 13-1 to 13-$n$ are both small, the load on the connection information database 16, such as registration or search, seems to be small as a whole. However, if the number of servers becomes a significantly large number such as several hundreds to several thousands, the amount of connection information is enormously increased. That is, several hundred to several thousand service buses register connection information in the connection information database 16 or search the connection information database 16 for connection information. Accordingly, traffic is congested, increasing overhead related to search of the connection information database 16. This causes a bottleneck in the performance of the entire system.

For example, assuming that several hundred service bus devices 13-1 to 13-$n$ each process one transaction per second, they makes a maximum of accesses several hundred to several thousand accesses per second, including those for registration of or search for connection information, to the connection information database. Assuming that connection information is held for a given period of time (several hours to several days), several million pieces of data are held even per hour, enormously increasing overhead to be used for search.

Now, the embodiment will be described with reference to the accompanying drawings.

<Hardware Configuration of Service Bus System>

Figure 4:
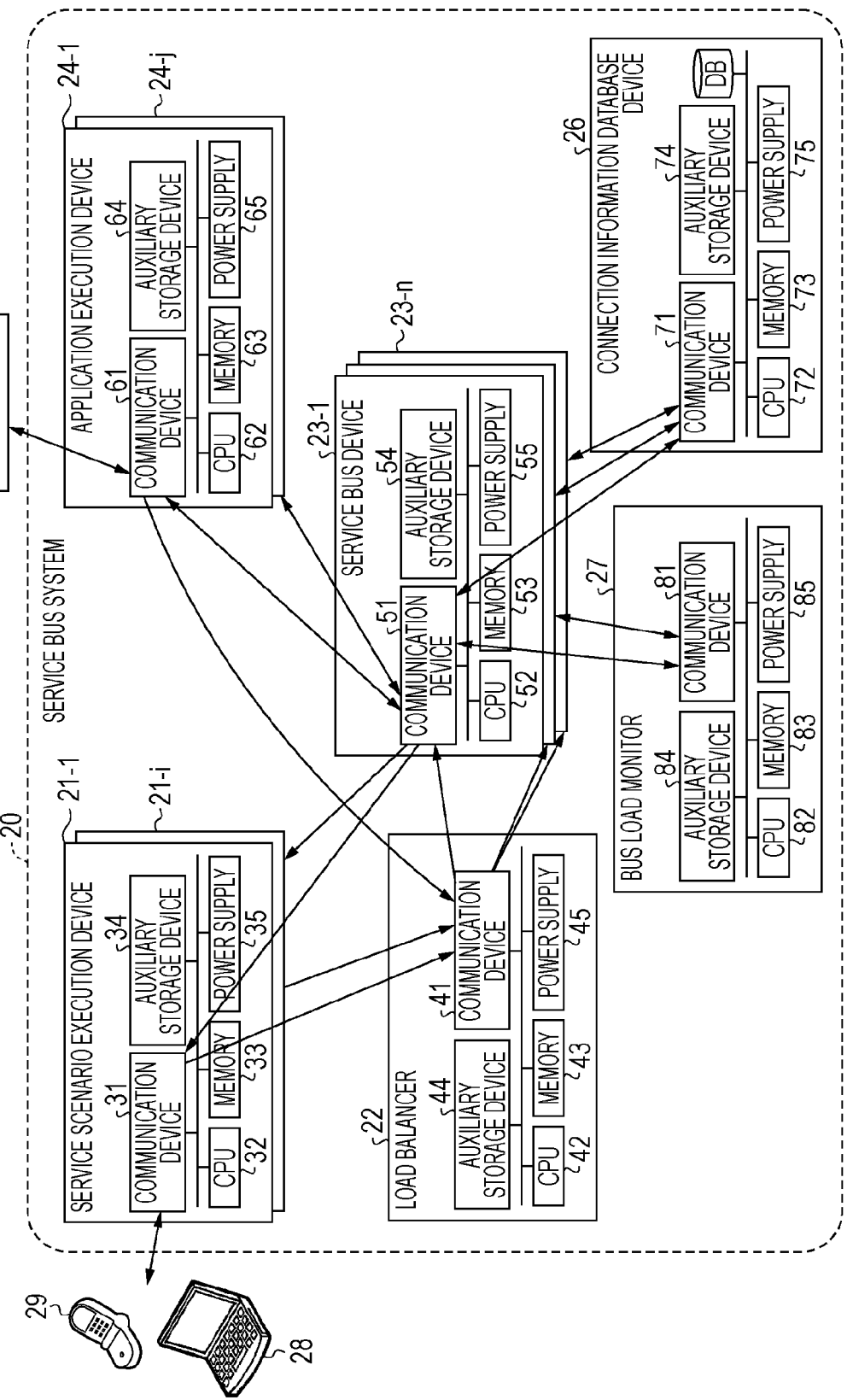
FIG. 4 is a diagram illustrating a hardware configuration of an example of a service bus system.

FIG. 4 is a diagram illustrating a hardware configuration of an example of a service bus system for performing network services. In FIG. 4, a service bus system 20 includes service scenario execution devices (may be referred to as "service scenarios") 21-1 to 21-$i$, a load balancer 22, service bus devices (may be referred to as "service buses") 23-1 to 23-$n$, application execution devices (may be referred to as "applications") 24-1 to 24-$j$, an connection information database device 26, and a bus load monitor 27. The service scenario execution devices 21-1 to 21-$i$ are an example of first devices, and the application execution devices 24-1 to 24-$j$ are an example of second devices.

The service scenario execution devices 21-1 to 21-$i$ each include a communication device 31, a central processing unit (CPU) 32, a memory 33, an auxiliary storage device 34, and a power supply 35 as hardware components. The communication device 31 is connected to user terminals 28 and 29 serving as service clients via a network (not shown), as well as connected to the respective communication devices of the load balancer 22 and the service bus devices 23-1 to 23-$n$. The CPU 32 executes a program stored in the memory 33 or auxiliary storage device 34 to execute a service scenario such as a network telephone directory service, voice translation service, or voice delivery service. The power supply 35 supplies electric power to the components of the service scenario execution device.

The load balancer 22 includes a communication device 41, a CPU 42, a memory 43, an auxiliary storage device 44, and a power supply 45 as hardware components. The communication device 41 is connected to the respective communication devices of the service scenario execution devices 21-1 to 21-$i$, the service bus devices 23-1 to 23-$n$, and the application execution devices 24-1 to 24-$j$. The CPU 42 executes a program stored in the memory 43 or auxiliary storage device 44 to allocate a requests or response received from one of the service scenario execution devices 21-1 to 21-$i$ or one of the application execution devices 24-1 to 24-$j$ to one of the service bus devices 23-1 to 23-$n$. Thus, the loads on the service bus devices 23-1 to 23-$n$ are distributed. The power supply 45 supplies electric power to the components of the load balancer.

The service bus devices 23-1 to 23-$n$ each include a communication device 51, a CPU 52, a memory 53, an auxiliary storage device 54, and a power supply 55 as hardware components. The communication device 51 is connected to the respective communication devices of the service scenario execution devices 21-1 to 21-$i$ and the load balancer 22. Thus, it serves as a connection information transmitter 93, a connection information receiver 94, and a connection information feedback unit 96 indicated in FIG. 5. The CPU 42 executes a program stored in the memory 53 or auxiliary storage device 54 to serve as a service bus device selection prediction unit 91, a unique connection execution unit 95, and a prediction accuracy manipulation unit 97 indicated in FIG. 5, as well as to perform a protocol conversion process, a data conversion process, a common protocol communication process, and the like. The memory 53 includes a connection information cache 92 indicated in FIG. 5. The auxiliary storage device 54 includes a bus list 98 and a service log 99 indicated in FIG. 5, as well as stores service bus default setting data. The power supply 55 supplies electric power to the components of the service bus device.

The application execution devices 24-1 to 24-$j$ each include a communication device 61, a CPU 62, a memory 63, an auxiliary storage device 64, and a power supply 65 as hardware components. The communication device 61 is connected to the respective communication devices of the service bus devices 23-1 to 23-$n$ and the load balancer 22. The communication device 61 is also connected to an external device 66 or the like. The CPU 62 executes an application program stored in the memory 63 or auxiliary storage device 64 to perform a position information process, a translation process, a 3PCC process, a groupware process, or the like. The power supply 65 supplies electric power to the components of the application execution device.

The connection information database device 26 includes a communication device 71, a CPU 72, a memory 73, an auxiliary storage device 74, and a power supply 75 as hardware components. The communication device 71 is connected to the respective communication devices of the service bus devices 23-1 to 23-$n$. The CPU 72 executes a program stored in the memory 73 or auxiliary storage device 74 to perform a process such as registration, search, update, or the like of the connection information database. Connection information is stored in the auxiliary storage device 74. The power supply 75 supplies electric power to the components of the connection information database device.

The bus load monitor 27 includes a communication device 81, a CPU 82, a memory 83, an auxiliary storage device 84, and a power supply 85 as hardware components. The communication device 81 is connected to the respective communication devices of the service bus devices 23-1 to 23-$n$. The CPU 82 executes a program stored in the memory 83 or auxiliary storage device 84 to perform a process of monitoring the loads on the service bus devices 23-1 to 23-$n$. The power supply 85 supplies electric power to the components of the bus load monitor.

<Functional Configuration of Service Bus Device>

FIG. 5 is a diagram illustrating a functional configuration of an example of a service bus device. In FIG. 5, the service bus device is referred by numeral 90, and corresponds to the service bus devices 23-1 to 23-$n$ of FIGS. 3-4, 11 and 15-16. In FIG. 5, the service bus device selection prediction unit 91 of a service bus device 90 receives a connection request from the load balancer (LB) 22. If the identifier of the connection request is not registered in any of the connection information cache 92 and the connection information database device 26, the service bus device selection prediction unit 91 determines that the connection request is the first request and predicts service bus devices to be selected. That is, if a session in which a service scenario execution device and an application execution device are connected together includes multiple sequences and the connection information has to be stored in the connection information database device 26, the service bus device selection prediction unit 91 predicts all service bus devices to be selected in this session. The service bus device selection prediction unit 91 transmits a list of the predicted service bus devices to the connection information transmitter 93. The service bus device selection prediction unit 91 is an example of a prediction unit.

The connection information transmitter 93 obtains the addresses of the predicted service bus devices from the list received from the service bus device selection prediction unit 91 and transmits to the predicted service bus devices a request identifier (request ID), the address of the service scenario execution device, and the address of the application execution device as connection information about the session. The connection information transmitter 93 is an example of a transmission unit.

The connection information receiver 94 of each of the predicted service bus devices receives the connection information about the session and stores the connection information and the number of the service bus device that has transmitted the connection information, in the connection information cache 92 included in the memory 53 along with the update date. At that time, to check the effectiveness of the cache, the last update date of each cache record is checked. If the effective time set for a service is exceeded, the cache record is deleted. The connection information cache 92 is an example of a storage unit.

The unique connection execution unit 95 compares the identifier of the request received from the load balancer 22 with the identifier of the request (request ID) included in the connection information stored in the connection information cache 92. If both are matched, the unique connection execution unit 95 regards the address of the application execution device included in the same connection information as the connection destination and transmits the request to this applicable application execution device. Similarly, the unique connection execution unit 95 compares the identifier of a response received from one of the application execution devices 24-1 to 24-$j$ with the identifier of the request (request ID) included in the connection information stored in the connection information cache 92. If both are matched, the unique connection execution unit 95 regards the address of the service scenario execution device in the same connection information as the connection destination and transmits the response to this service scenario execution device. The unique connection execution unit 95 is an example of a connection unit.

In contrast, if the connection information cache 92 includes no record of the identifier of the request, the unique connection execution unit 95 searches the connection information database device 26 to obtain connection information and stores the obtained connection information in the connection information cache 92. The unique connection execution unit 95 then transmits the request to a relevant application execution device. Similarly, if the connection information cache 92 includes no record of the identifier of the response, the unique connection execution unit 95 searches the connection information database device 26 to obtain connection information and stores the obtained connection information in the connection information cache 92. The unique connection execution unit 95 then transmits the response to a relevant service scenario execution device.

Further, the unique connection execution unit 95 transmits, to the connection information feedback unit 96, information indicating whether the connection information cache 92 has been hit, as well as the identifier of the request, the type (request or response), and its own service bus number.

The connection information feedback unit 96 searches the connection information cache 92 using the request identifier received from the unique connection execution unit 95 to extract the number of the service bus device that has transmitted the connection information. The connection information feedback unit 96 then transmits connection feedback information, including information indicating whether the cache has been hit and the type (request or response), to the prediction accuracy manipulation unit 97. The connection information feedback unit 96 is an example of a feedback unit.

Based on the connection feedback information received from the connection information feedback unit 96 of another service bus device, the prediction accuracy manipulation unit 97 registers data in the bus list 98 and the service log 99 or updates the bus list 98 and the service log 99. The prediction accuracy manipulation unit 97 is an example of a correction unit.

In the bus list 98, session attributes such as the predicted hit number, the connection time zone, the cumulative number of service connections, and the load state are registered or updated with respect to the service bus number of each of service bus devices actually used in the session in which the service bus device selection prediction unit 91 has made prediction. The bus list 98 is an example of a storage unit.

In the service log 99, session attributes such as the number of service bus devices actually used, whether the session is complete, and the last update date, are registered or updated for each of sessions in which prediction has been made. The service log 99 is an example of a storage unit.

<Data Structure of Connection Information>

FIG. 6 illustrates an example of the data structure of connection information held by the connection information cache 92 and the connection information database device 26. Stored in the field of service number are serial numbers. Stored in the field of request identifier (request ID) are identifiers uniquely determined by a string of service number, app identifier, session identifier, and serial number. Stored in the field of service scenario node are the addresses of service scenario execution devices expressed in URL form (protocol+address) and generated from an IP header, a port, and the like. Stored in the field of app node are the addresses of application execution devices expressed in URL form and solved or generated by the service bus itself. Stored in the field of last update date are the last update dates used when a record is deleted. Stored in the field of prediction true/false information destination are the IP addresses or host names of service bus devices that have performed the first connection process, in order to transmit information indicating whether the cache has been hit when a connection process is performed.

<Bus List>

FIG. 7 illustrates an example of the data structure of the bus list 98. Stored in the field of service bus number is a service bus number determined based on a service bus device distribution rule. Stored in the field of address is the IP address or host name of a service bus device. Stored in the fields of time zone 1 (weighted value), time zone 2 (weighted value), service 1 (weighted value), service 2 (weighted value), etc. are weighted values that are manipulated according to whether the prediction of a bus to be selected next has come true and correspond to each service bus device selection prediction logic. A weighted value is determined by disparities in selection frequency among time zones, disparities among services, or the like.

<Service Log>

FIG. 8 illustrates an example of the data structure of the service log 99. Stored in the field of service number is a serial number corresponding to a service. Stored in the field of app number is an identifier uniquely determined for each application. Stored in the field of session identifier is the identifier of a pair of a service scenario execution device and an application execution device.

Stored in the field of used service bus number is the number of service bus devices used with respect to each request identifier. Stored in the field of session completion flag is a flag indicating whether the sequences of a request identifier are complete, that is flag indicating whether the used service bus number has been determined. Stored in the field of last update date is the last update dates used when a record is deleted or refreshed.

<Service Bus Default Setting Data>

Service bus default setting data, which is discrete definition data held in a file or the like, will be described without reference to the accompanying drawings. This service bus default setting data is stored in the auxiliary storage device 54 of each service bus device.

A default predicted bus number refers to the default number of service buses to be predicted. A connection information effective period refers to the effective life time of connection information corresponding to each service number in the connection information database device 26 or the connection information cache 92. A predicted bus correction value refers to a correction value for a service bus device number corresponding to a service session identified by a service number and a session identifier. A weight addition condition refers to a correction value added to a weight field of the bus list 98. An estimated weight rate refers to the rate to a value in a weight field of the bus list 98.

<Inter-Device Message>

FIGS. 9A, 9B, and 9C each illustrate an example of the data structure of an inter-device message. FIG. 9A illustrates the data structure of connection information transmitted or received between service bus devices. A connection information message includes a request identifier (request ID), the address of a service scenario execution device (service scenario URL), the address of an application execution device (app URL), and a true/false result destination, that is, the address of the source of the connection information.

FIG. 9B illustrates the data structure of connection feedback information transmitted or received between service bus devices. Connection feedback information includes a request identifier (request ID), type (request or response; 0: request, 1: response), the number of a service bus device that transmits the connection feedback information, and a pass/fail result (1: cache hit, other than 1: no cache hit).

FIG. 9C illustrates the data structure of load state information transmitted or received between a service bus device and the bus load monitor 27. Load state information includes a service bus device number for identifying a service bus device, a collection date, the CPU load of the service bus device, and an operating bus session number.

<Flowchart of Service Bus Device>

FIG. 10 is a flowchart illustrating an example of a selection prediction process performed by the service bus device 90. In operation S1 of FIG. 10, the service bus device 90 receives a signal from outside. In operation S2, the service bus device 90 determines whether the signal received is connection feedback information from another service bus device, a request or response received via the load balancer 22, or connection information from another service bus device.

If the signal received is a request or response provided by the load balancer 22, that is, a request from a service scenario execution device or a response from an application execution device, the service bus device selection prediction unit 91 checks whether the identifier of the request or response is present in the connection information cache 92, in operation S3. If the request identifier is determined in operation S4 not to be present in the connection information cache 92, the service bus device selection prediction unit 91 checks whether the request identifier is present in the connection information database device 26, in operation S5. The request identifier is determined in operation S6 not to be present in the connection information database device 26, the service bus device selection prediction unit 91 determines that the signal is the first connection request in a session and proceeds to operation S7.

In operation S7, the service bus device selection prediction unit 91 analyzes the first connection request to extract an application execution device (or service scenario execution device). In operation S8, the service bus device selection prediction unit 91 registers the extracted application execution device (or service scenario execution device) in the connection information cache 92 along with the request identifier. In operation S9, the service bus device selection prediction unit 91 registers the extracted application execution device (or service scenario execution device) in the connection information database device 26 along with the request identifier.

In operation S10, the service bus device selection prediction unit 91 predicts all service bus devices to be selected in this session and transmits a list of the predicted multiple service bus devices to the connection information transmitter 93. In operation S11, the connection information transmitter 93 obtains the addresses of the predicted service bus devices from the list transmitted by the service bus device selection prediction unit 91 and transmits the connection information about the session, that is, the request identifier, the address of the service scenario execution device, and the address of the application execution device to these service bus devices. In operation S12, the unique connection execution unit 95 transmits the connection request to the application execution device extracted in operation S7 and completes this process.

If the request identifier is determined in operation S4 to be present in the connection information cache 92, the connection information feedback unit 96 sets "cache hit" in connection feedback information in operation S13 and proceeds to operation S15. If the request identifier is determined in operation S6 to be present in the connection information database device 26, the connection information feedback unit 96 sets "no cache hit" in connection feedback information in operation S14 and proceeds to operation S15.

In operation S15, the connection information feedback unit 96 searches the connection information cache 92 using the identifier of the request or response received in operation S1 to extract the number of the service bus device that has transmitted the connection information. The connection information feedback unit 96 then transmits the connection feedback information to this service bus device. In operation S16, the unique connection execution unit 95 transmits the request or response to the application execution device (or service scenario execution device) extracted in operation S7 and completes this process.

In contrast, if the signal received in operation S2 is connection feedback information from another service bus device, the prediction accuracy manipulation unit 97 registers or updates data in the bus list 98 and the service log 99 on the basis of this connection feedback information, in operation S17.

If the signal received in operation S2 is connection information from another service bus device, the connection information receiver 94 stores this connection information in the connection information cache 92 included in the memory 53 along with the update date in operation S18 and completes this process.

<Operation in Service Bus System>

Figure 11:
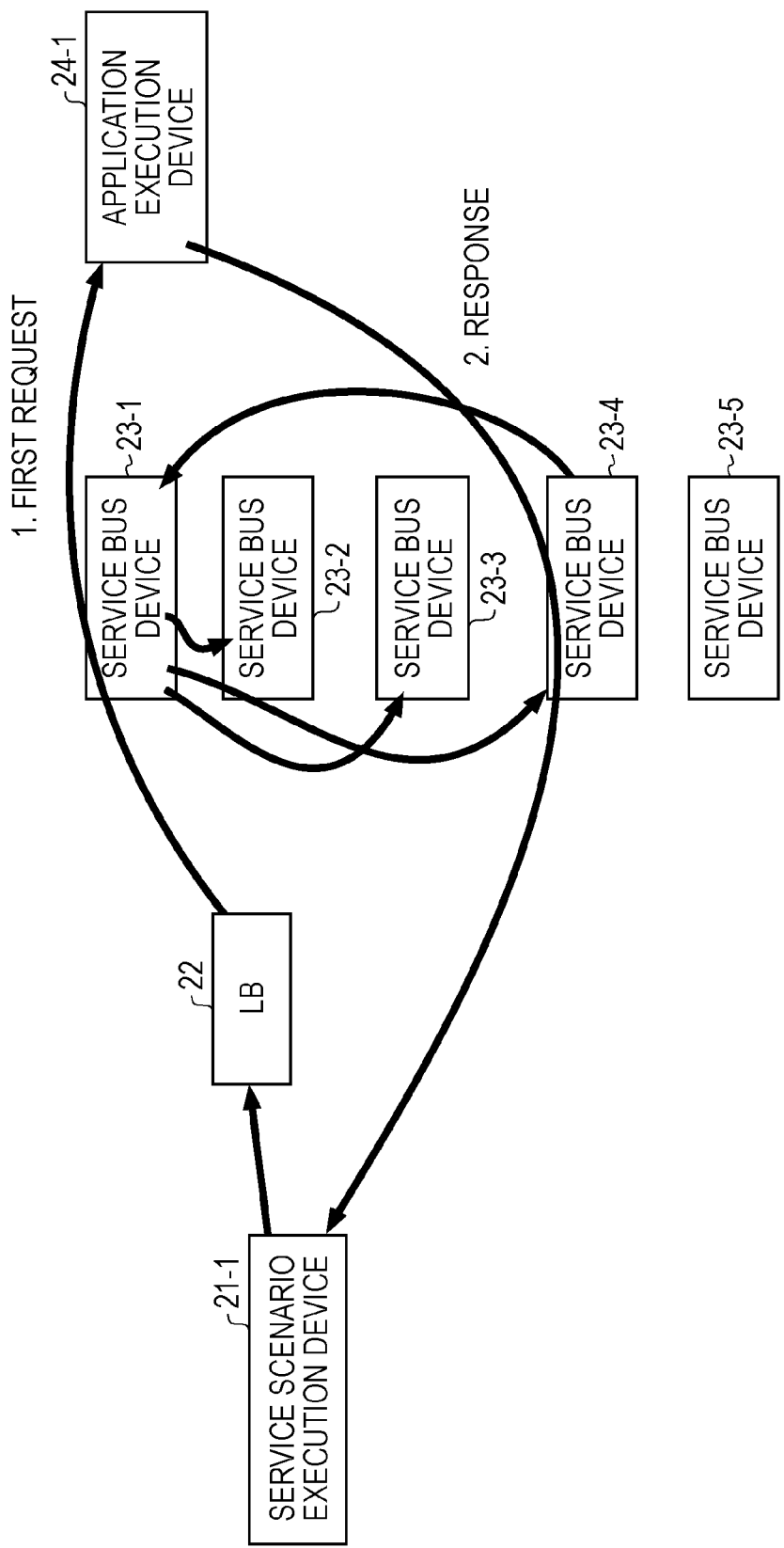
FIG. 11 is diagram illustrating a connection uniqueness assurance operation.

Referring to FIG. 11, and connection uniqueness assurance operation in the service bus system will be described. In this embodiment, when one of the service bus devices 23-1 to 23-n connects between one of the service scenario execution apparatuses 21-1 to 21-i and one of the application execution apparatuses 24-1 to 24-j in the first sequence of a session, the service bus device registers information indicating the connection therebetween in the connection information database device 26 and simultaneously transmits the connection information to multiple service bus devices to which a response may be allocated in the next sequence of the same session.

In FIG. 11, the first sequence of the session is the first request from the service scenario execution apparatus 21-1 to the application execution devices 24-1, and the first request is allocated to the service bus apparatus 23-1 by the load balancer 22. The second sequence is a response from the application execution devices 24-1 to the service scenario execution apparatus 21-1, and the response is allocated to the service bus apparatus 23-4 by the load balancer 22. Note that the response from the application execution devices 24-1 to the service scenario execution apparatus 21-1 in the second sequence may be allocated to the service bus apparatus 23-4 by a load balancer different from the load balancer 22. In this case, the different load balancer allocates the response by the same allocation logic as the load balancer 22.

In the first sequence of the session, the service bus apparatus 23-1 registers information indicating the connection between the service scenario execution apparatus 21-1 and the application execution devices 24-1 and simultaneously transmits the connection information to the service bus devices 23-2, 23-3, and 23-4 to which a response may be allocated in the next sequence of the same session.

The service bus devices 23-2, 23-3, and 23-4 each receive the connection information and hold it in the connection information cache 92 of the memory 53. When a request or response in the same session is allocated to one of the service bus devices 23-2, 23-3, and 23-4 holding the connection information in the next or later sequences, that is, when the prediction comes true, the service bus device with respect to which the prediction came true does not have to access the connection information database device 26. Thus, the number of accesses made to the connection information database device 26 can be reduced.

When a request or response in the same session is allocated to the service bus apparatus 23-5, to which the connection information has not been transmitted, that is, when the prediction did not come true, the service bus apparatus 23-5 accesses the connection information database device 26 as is done conventionally to obtain the connection information. Thus, connection uniqueness is assured.

<Flowchart of Service Bus Number Prediction Process>

Figure 12:
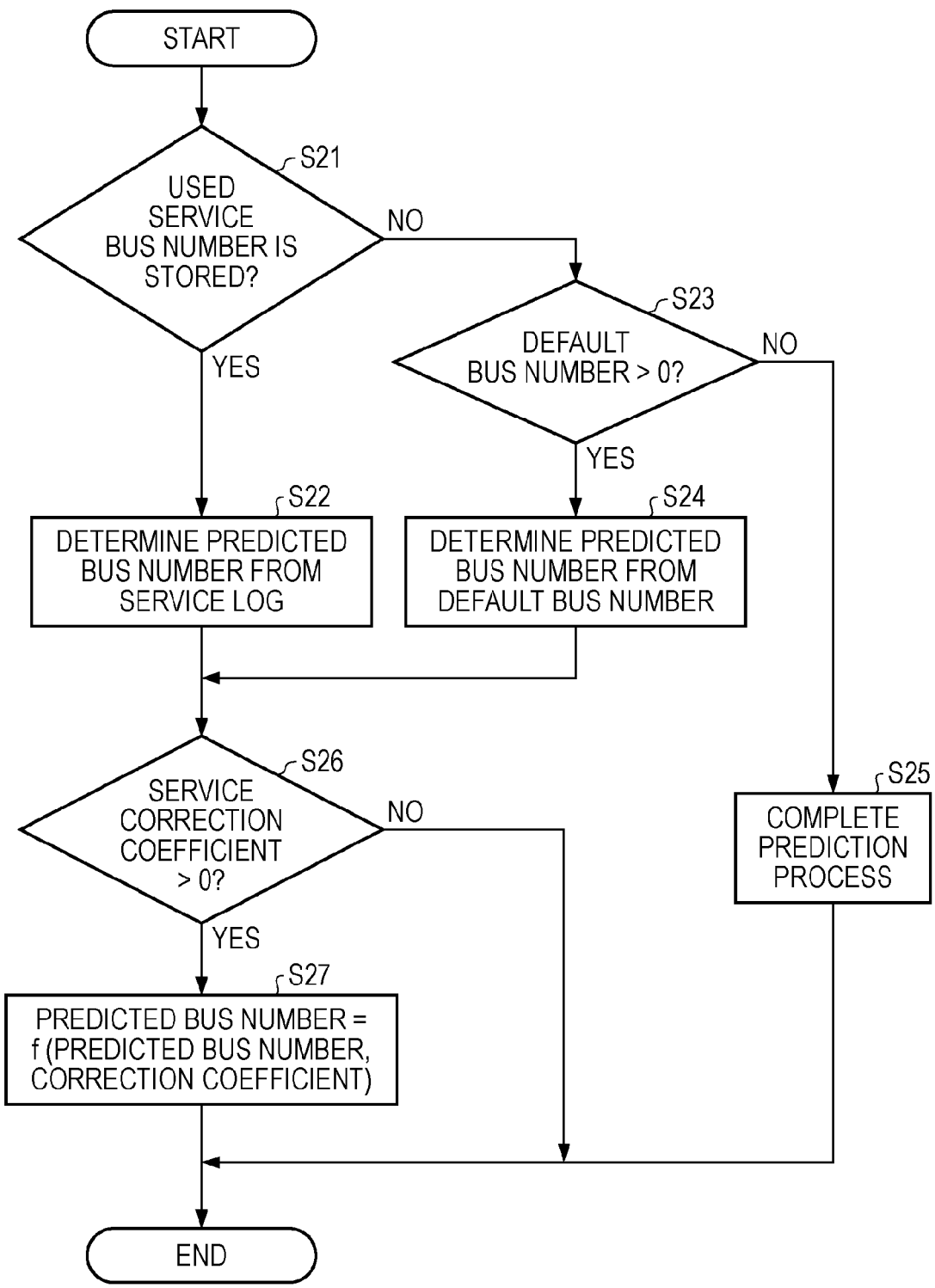
FIG. 12 is a flowchart illustrating an example of a service bus number prediction process.

FIG. 12 is a flowchart illustrating an example of a service bus number prediction process performed by the service bus device selection prediction unit 91. This process is a process where, in the first sequence of a session, the service bus device selection prediction unit 91 predicts and lists service bus devices that the load balancer 22 may select in the second or later sequences of the session.

In operation S21 of FIG. 12, the service bus device selection prediction unit 91 refers to the service log 99 using a service number to determine whether a used service bus number is stored. If a used service bus number is stored, the service bus device selection prediction unit 91 obtains it and regards the obtained used service bus number as the number of buses to be predicted, in operation S22. When no used service bus number is stored, the service bus device selection prediction unit 91 determines whether a default number of buses to be predicted is defined in service bus default setting data stored in the auxiliary storage device 54, in operation S23. If a default number of buses to be predicted is defined, the service bus device selection prediction unit 91 regards the defined default number of buses to be predicted as the number of buses to be predicted, in operation S24. When no default number of buses to be predicted is defined, the service bus device selection prediction unit 91 completes this service bus number prediction process in operation S25.

After operation S22 or operation S24, the service bus device selection prediction unit 91 in operation S26 determines whether a correction coefficient for a service bus device number with respect to this service session, that is, a correction value for the number of buses to be predicted is defined in the service bus default setting data. Only if a correction coefficient is defined, that is, if a correction coefficient exceeds 0, the service bus device selection prediction unit 91 corrects the number of buses to be predicted determined in operation S22 or operation S24 using the correction coefficient and completes this service bus prediction process.

<Service Bus Device Prediction>

The service bus device selection prediction unit 91 extracts a number of service bus device numbers corresponding to the number of buses to be predicted in a selection prediction process corresponding to the allocation logic of the load balancer 22. The allocation logic of the load balancer 22 contemplates two systems: static load balancing, which uses round robin, and dynamic load balancing, where environment-dependent allocation such as selection of a minimum load node is performed. The service bus device selection prediction unit 91 has selection prediction logic corresponding to both static load balancing and dynamic load balancing. The two systems of selection prediction logic can be switched, and the two systems of selection prediction logic can be combined by AND or OR. The above-mentioned service bus device prediction is performed only by a service bus device that makes a connection in the first sequence of a session.

<Prediction of Static Load Balancing>

Figure 13:
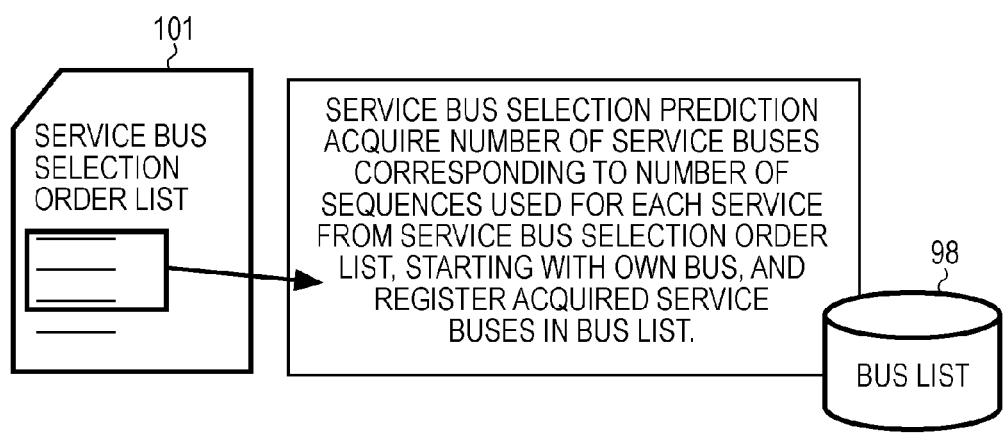
FIG. 13 is diagram illustrating static load balancing prediction.

Prediction of static load balancing corresponding to round-robin allocation will be described. In round robin, service bus devices are selected in a fixed order. Accordingly, a service bus device selection order list can be previously created. A created service bus device selection order list 101 illustrated in FIG. 13 is held by, for example, the auxiliary storage device 54. The service bus device selection prediction unit 91 sequentially extracts a number of service bus device numbers corresponding to the number of buses to be predicted from the service bus device selection order list 101, starting with its own service bus device number. It then registers the extracted service bus device numbers in the bus list 98 illustrated in FIG. 13. For example, if the number of session sequences of any service, that is, the total number of requests and responses is ten, the service bus device selection prediction unit 91 searches the service bus device selection order list for its own service bus number and retrieves ten service bus numbers, starting with the its own service bus number.

<Prediction of Dynamic Load Balancing 1>

If patterns of allocation performed by the load balancer 22 can be conceived on the basis of disparities among time zones, services used, or the like, a service bus device can estimate a bus selection probability by learning the allocation patterns.

Figure 14:
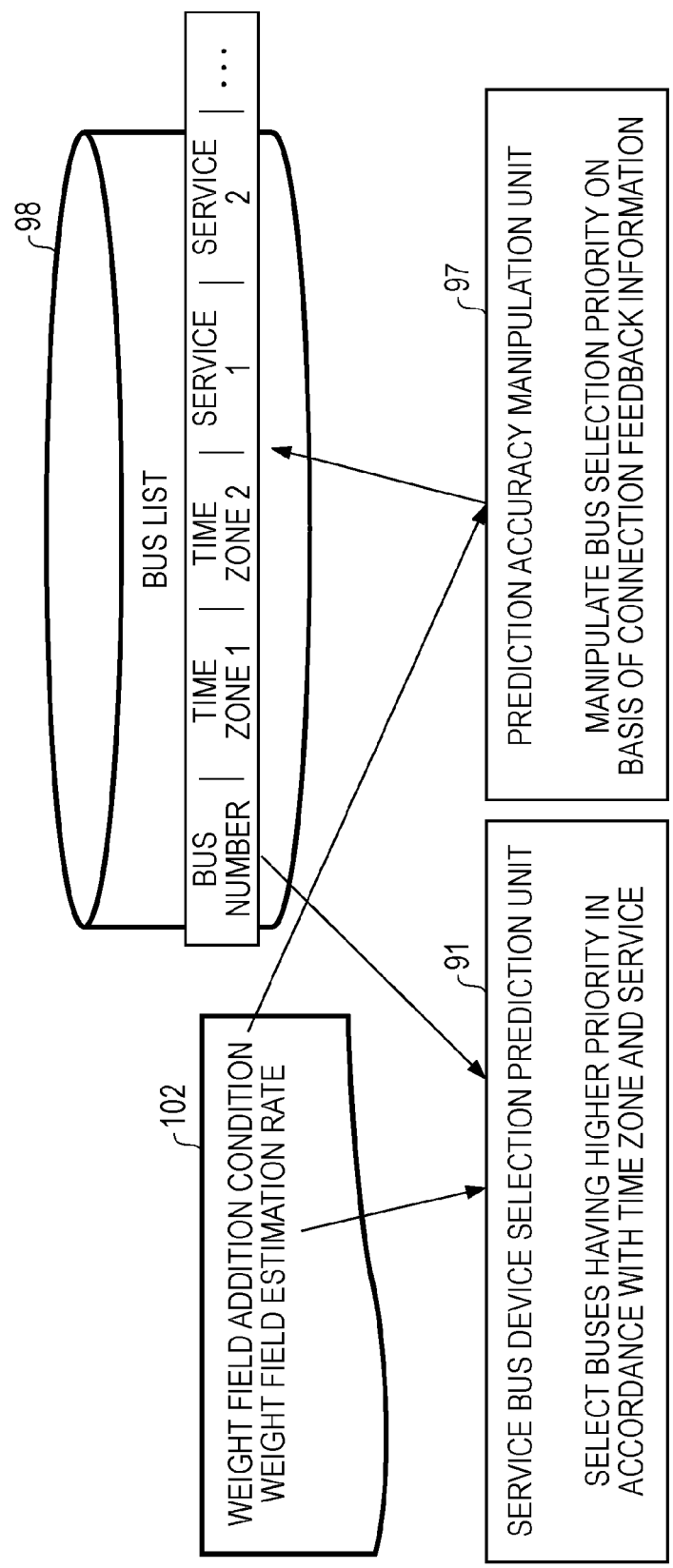
FIG. 14 is diagram illustrating dynamic load balancing prediction.
Figure 15:
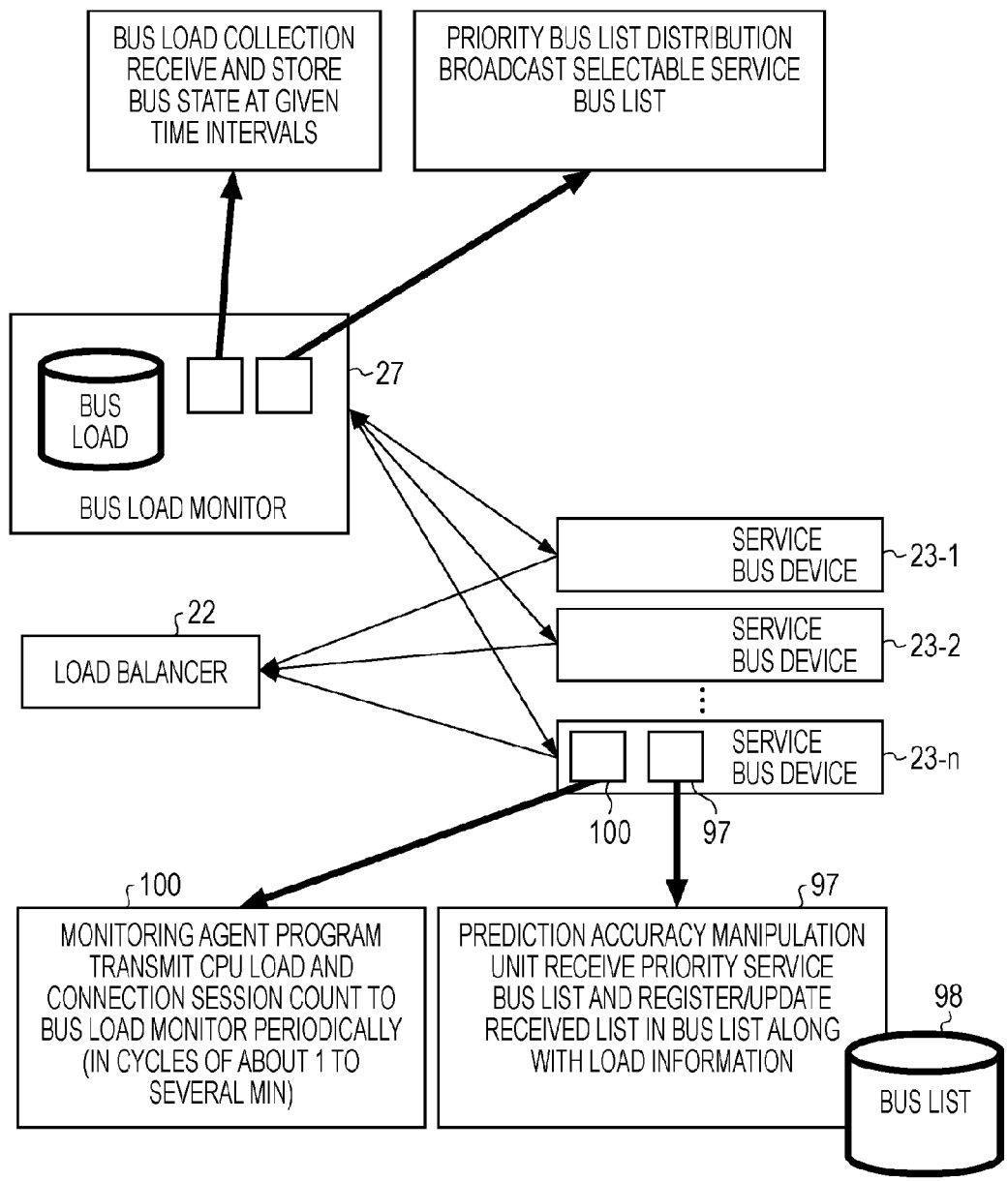
FIG. 15 is diagram illustrating dynamic load balancing prediction.

When the prediction accuracy manipulation unit 97 receives connection feedback information from a used service bus device, it extracts a weight addition condition, that is, respective correction values to be added to the weight fields of the bus list 98 from service bus default setting data 102 illustrated in FIG. 14. The prediction accuracy manipulation unit 97 then adds the extracted correction values to the corresponding actual values in the weight fields of the bus list 98, such as the time zones 1 and 2 and services 1 and 2.

In the selection of buses, the service bus device selection prediction unit 91 extracts weight estimation rates from the service bus default setting data 102, multiplies the corrected actual values in the weight field corresponding to each service bus device by the weight estimation rates, and calculates the sum of the multiplication results, obtaining priority of each service bus device. The service bus device selection prediction unit 91 then extracts service bus devices from the bus list 98 in the descending order of priority.

In an example illustrated in FIG. 14, with respect to a service bus device used in time zone 1 and service 2, prediction bus correction values (e.g., 100) set in the fields of service bus default setting data are added to the actual values in the corresponding weight fields of the bus list 98 on the basis of received connection feedback information.

When a connection request is made in the same time zone and the same service, the service bus device selection prediction unit 91 sums up these pieces of weight information and obtains priority using Formula (1).

$$\text{Priority} = \text{actual value in time zone } 1 \times \text{weight estimation rate of time zone } 1 + \text{actual value in service } 2 \times \text{weight estimation rate of service } 2 \quad (1)$$

The weight estimation rate of time zone 1 is, e.g., 0.6, and the weight estimation rate of service 2 is, e.g., 0.3. The service bus device selection prediction unit 91 obtains the priority of its own service bus device using Formula (1) and selects a number of service bus devices corresponding to the bus number determined in the service bus number prediction process in the descending order of priority.

<Prediction of Dynamic Load Balancing 2>

To monitor the loads on the service bus devices to distribute the loads, the load balancer 22 periodically receives the node states such as CPU load or in-connection session count using a monitoring agent program installed in each of the service bus devices to which a request or response may be allocated and determines allocation on the basis of the node states.

Accordingly, providing the same logic as the load balancer 22 to the service bus devices 23-1 to 23-n allows an increase in bus selection prediction accuracy. As illustrated in a functional configuration diagram of FIG. 15 and an operation sequence of FIG. 16, the bus load monitor 27, which is independent of the service bus devices 23-1 to 23-n, collects the load states such as CPU load or session count during connection via the monitoring agent program 100 installed in all the service bus devices 23-1 to 23-n at predetermined time intervals (sequence SQ1 of FIG. 16).

Figure 16:
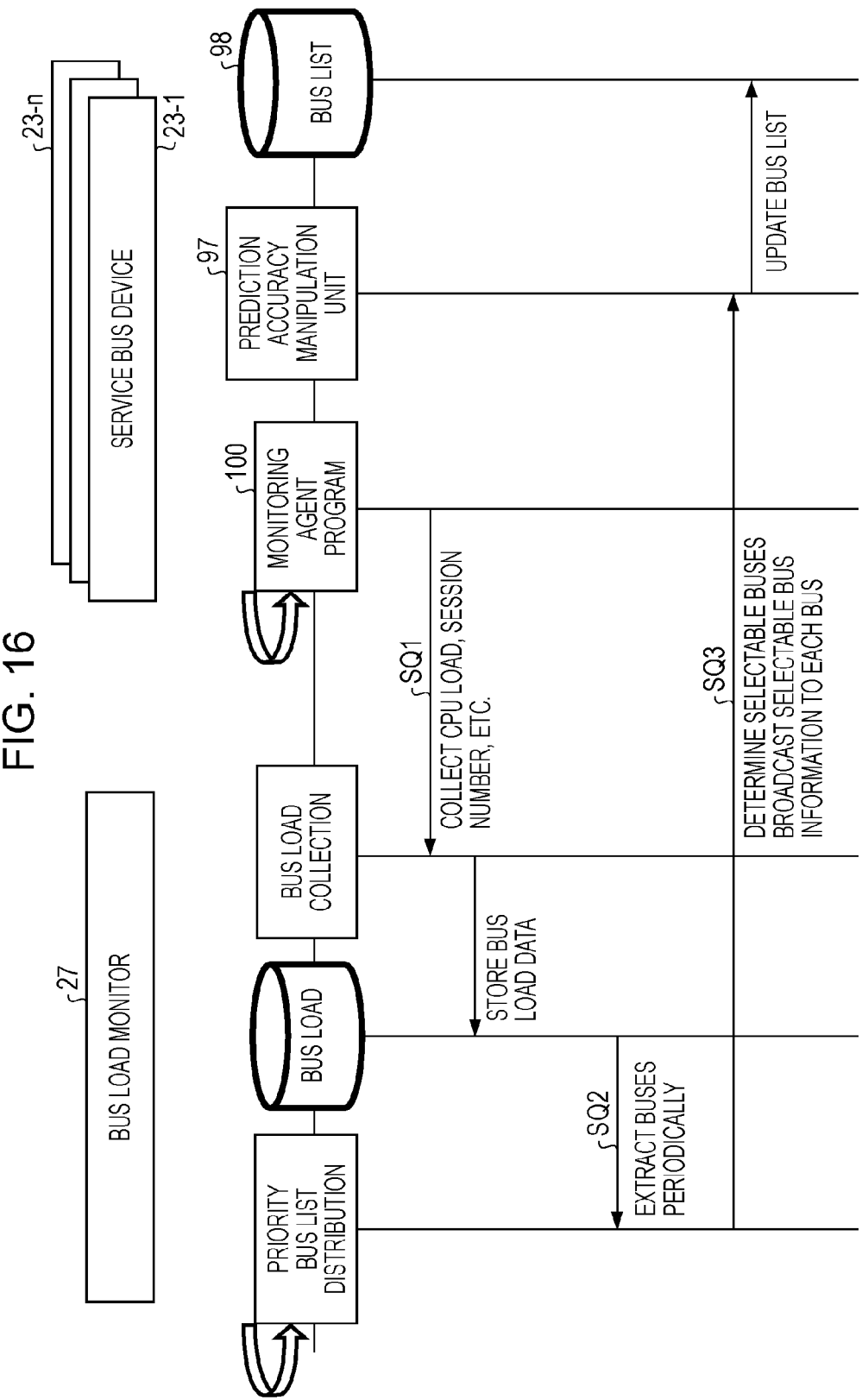
FIG. 16 is a diagram illustrating operation sequences of dynamic load balancing prediction.

Based on these pieces of information, the bus load monitor 27 extracts all service bus devices that can be selected preferentially (SQ2 of FIG. 16). The bus load monitor 27 then broadcasts information indicating the extracted selectable service bus devices to all the service bus devices 23-1 to 23-n. The prediction accuracy manipulation units 97 of the service bus devices 23-1 to 23-n update the respective bus lists 98 using these pieces of data (SQ3 of FIG. 16).

In this case, fundamental constants such as node monitoring interval, broadcast transmission interval, CPU load and selectable bus threshold of connection session count, and maximum extraction bus number are previously defined in the bus load monitor 27 in the form of a setting definition file or the like. Since the allocation condition of the load balancer 22 is basically approximately emulated, more accurate service bus device selection prediction can be made as the service bus device load monitoring condition is brought closer to the monitoring condition of the load balancer 22.

It is considered to provide multiple connection information databases 26 in a distributed manner to distribute the load. Examples of the distribution logic of a database include fixed distribution based on user ID, service bus device number, or the like and hash distribution, where a database number is determined by performing digitization using a hash function with a request identifier or the like used as a key. However, since the uniformity of load distribution of a database is not assured, local access to the database causes a bottleneck. Depending on the performance of the database, several tens to several hundred connection information database devices 26 may have to be provided in a distributed manner. As a result, the cost for introduction, development, and maintenance of hardware and software is expanded.

In contrast, according to this embodiment, multiple connection information database devices 26 don't have to be provided in a distribution manner. This inhibits local access to the above-mentioned database from causing a bottleneck, as well as inhibits an increase in cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A service bus system comprising:
   a plurality of first devices each coupled with a client;
   a plurality of second devices each to perform a service;
   a first service bus device through which sequences of a session between a first device of the plurality of first devices and a second device of the plurality of second devices are communicated, including:
   a prediction unit, when connection between one of the plurality of first devices and one of the plurality of second devices is established in a first sequence of the session, to predict one or more other service bus devices through which connection between the first device and the second device in a second or later sequence of the session is established; and
   a transmission unit to transmit information indicating the connection between the first device and the second device in the first sequence of the session to the one or more other service bus devices predicted by the prediction unit; and
   a second service bus device through which the sequences of the session between the first device and the second device are communicated, including:
   a storage unit to hold the information indicating the connection between the first device and the second device in the first sequence of the session transmitted from the first service bus device; and
   a connection unit, when the second service bus device receives the second or later sequence of the session and the storage unit holds the information indicating the connection between the first device and the second device in the first sequence of the session, to establish the connection between the first device and the second device in the second or later sequence of the session by using the connection information held by the storage unit,
   wherein one of the one or more other service bus devices predicted by the first service bus device is the second service bus device.

2. The service bus system according to claim 1,
   wherein the second service bus device further includes a feedback unit, when the storage unit holds the information indicating the connection between the first device and the second device in the first sequence of the session, to transmit feedback information indicating that prediction has come true, to the first service bus device; and
   wherein the first service bus device further includes a correction unit to correct a value used by the prediction unit for prediction, based on the feedback information transmitted from the second service bus device.

3. The service bus system according to claim 1, wherein the prediction unit predicts the one or more other service bus devices from the service bus devices in a fixed order.

4. The service bus system according to claim 1, wherein the prediction unit predicts the one or more other service bus devices, based on respective operating states of the service bus devices.

5. A service bus device through which sequences of a session between a first device coupled with a client and a second device to perform a service are communicated, the service bus device comprising:
   a prediction unit, when connection between the first device and the second device is established in a first sequence of a session, to predict one or more other service bus devices through which connection between the first device and the second device in a second or later sequence of the session is established;

a transmission unit to transmit information indicating the connection between the first device and the second device in the first sequence of the session to the one or more other service bus devices predicted by the prediction unit;

a storage unit to hold the information indicating the connection between the first device and the second device in the first sequence of the session transmitted by the transmission unit of another service bus device; and a connection unit, when the storage unit of a service bus device that has received the second or later sequence of the session holds the information indicating the connection between the first device and the second device in the first sequence of the session, to establish connection between the first device and the second device in the second or later sequence of the session by using the connection information held by the storage unit.

6. The service bus device according to claim 5, further comprising:

a feedback unit, when the storage unit of the service bus device that has received the second or later sequence of the session holds the information indicating the connection between the first device and the second device in the first sequence of the session, to transmit feedback information indicating that prediction has come true, to a service bus device that has transmitted the connection information held by the storage unit; and a correction unit to correct a value used by the prediction unit for prediction, based on the feedback information transmitted from the feedback unit of another service bus device.

7. The service bus device according to claim 5, wherein the prediction unit predicts the one or more other service bus devices from the service bus devices in a fixed order.

8. The service bus device according to claim 5, wherein the prediction unit predicts the one or more other service bus devices, based on respective operating states of the service bus devices.

9. A method for assuring connection uniqueness in a service bus system including a plurality of first devices each coupled with a client, a plurality of second devices each to perform a service, and first and second service bus devices each through which sequences of a session between the first device and the second device are communicated, the method comprising:

predicting one or more other service bus devices through which connection between the first device and the second device in a second or later sequence of the session is established, when connection between a first device of the plurality of first devices and a second device of the plurality of second devices is established in a first sequence of the session, by the first service bus device;

transmitting information indicating the connection between the first device and the second device in the first sequence of the session to the predicted one or more other service bus devices, by the first service bus device;

holding the information indicating the connection between the first device and the second device in the first sequence of the session transmitted by the first service bus device, by the second service bus device; and establishing connection between the first device and the second device in the second or later sequence of the session by using the held connection information, when the second service bus device receives the second or later sequence of the session and holds the information indicating the connection between the first device and the second device in the first sequence of the session, by the second service bus device.

10. The method for assuring connection uniqueness according to claim 9, further comprising:

transmitting feedback information indicating that prediction has come true, to a service bus device that has transmitted the held connection information, when the service bus device that has received the second or later sequence of the session holds the information indicating the connection between the first device and the second device in the first sequence of the session; and correcting a value used to predict the one or more other service bus devices, based on the feedback information transmitted from the second service bus device.

11. The method for assuring connection uniqueness according to claim 9, wherein the one or more other service bus devices are predicted from the service bus devices in a fixed order.

12. The method for assuring connection uniqueness according to claim 9, wherein the one or more other service bus devices are predicted, based on respective operating states of the service bus devices.

* * * * *